United States Patent [19] [11] 3,912,283

Hammond et al. [45] Oct. 14, 1975

[54] TURNTABLE SPEED LOCK SYSTEM

[75] Inventors: Robert James Hammond, Stevensville; Carl Wayne Miller; Larry Fred Culver, both of Dowagiac, all of Mich.

[73] Assignee: RCA Corporation, New York, N.Y.

[22] Filed: Sept. 10, 1974

[21] Appl. No.: 504,486

[52] U.S. Cl. .................... 274/39; 318/138; 318/41
[51] Int. Cl.² .................... G11B 3/60
[58] Field of Search ...... 274/39; 318/138, 301, 195, 318/41, 43

[56] References Cited

UNITED STATES PATENTS

| | | | |
|---|---|---|---|
| 3,445,117 | 5/1969 | Zakrzewski | 274/39 A |
| 3,683,248 | 8/1972 | Kobayashi et al. | 274/39 A X |
| 3,803,433 | 4/1974 | Ingenito | 318/138 X |

*Primary Examiner*—Richard E. Aegerter
*Assistant Examiner*—Larry Jones
*Attorney, Agent, or Firm*—Eugene M. Whitacre; Dilip A. Kulkarni

[57] ABSTRACT

A turntable speed lock system is provided to supplement an inexpensive main motor which drives the turntable through a pulley-belt arrangement, and which main drive arrangement fails to maintain the turntable rotation at a predetermined speed within specified tolerance limits desired for proper operation. A rotor ring, having a plurality of permanently magnetized poles of alternate polarity along its periphery, is mounted concentrically on the turntable for rotation therewith. A stator assembly including a core with an airgap, for receiving the rotatable rotor ring, is fixedly mounted on a turntable mounting plate. The stator assembly further includes a field winding for establishing an alternating field across the airgap. The magnetized poles freely pass, a seriatim, through the airgap when the turntable-mounted rotor ring is rotated by the main motor. The rotor ring and stator assembly function as a synchronous motor wherein the reluctance across the airgap is minimum when the turntable-mounted rotor ring is rotating at the predetermined speed, thereby locking the turntable to rotate at the predetermined speed within the specified tolerance limits.

10 Claims, 6 Drawing Figures

TURNTABLE SPEED LOCK SYSTEM

BACKGROUND OF THE INVENTION

The present invention relates to a turntable speed control system. More specifically, the present invention relates to a relatively inexpensive turntable speed lock system and yet having high accuracy for maintaining the turntable rotation at a predetermined speed and within specified tolerance limits.

Numerous information recording and playback systems require a turntable to be rotated at a precise speed for proper operation. For example, such a requirement exists in a video disc system described hereinafter. In certain video disc systems, video information is recorded by means of geometric variations in the bottom of a smooth spiral groove on the surface of a disc. The disc surface includes a coating of conductive material which is preferably covered with a thin deposit of dielectric material. A single pickup engages the spiral groove and includes a conductive surface which, together with the conductive coating and dielectric deposit of the disc, form a capacitor. When the disc is rotated, an edge of the conductive surface of the pickup, while riding in the disc groove, recovers capacitive variations due to the geometric variations in the bottom of the spiral groove. The capacitive variations, indicative of prerecorded video information (such as in NTSC format), are applied to a suitable signal processing circuit and electrical signals obtained therefrom are then coupled to a conventional television receiver for reproduction. The variable capacitor concept, as applied to video disc systems, is described in detail in the copending U.S. patent application, Ser. No. 126,772, filed Mar. 22, 1971, for J. K. Clemens, entitled, "Information Records and Recording/Playback Systems Therefor," also assigned to the present assignee.

In video disc systems of the aforementioned Clemens' type (U.S. patent application, Ser. No. 126,772), it has been recognized that, not only the average speed of relative motion between the disc and the pickup must be maintained at a predetermined speed (e.g., 450 rpm), but the speed variations about the average speed must be maintained within specified tolerance limits (e.g., ±0.01 percent), in order to obtain high fidelity of reproduction of the prerecorded signals. The predetermined speed and the specified tolerance limits are also necessary to assure that the horizontal and vertical synchronizing information is stable and within the lockup range of the deflection circuits of the television receiver. Moreover, when the prerecorded information is a color television signal with chrominance information recorded as a modulated carrier signal, the recovered signal must be stable and within the lockup range of the color processing circuits of the playback system in order to minimize phase distortion.

Further, in audio frequency playback systems, the turntable speed and the signal frequency are low compared to video playback systems. Therefore, the turntable speed errors (e.g., wow and flutter) present in the audio playback systems can be adequately reduced by the design of the turntable mechanism and residual velocity errors of ±0.5 percent are unnoticeable. With video frequency recording, however, a very small velocity error (i.e., ±0.01 percent) will noticeably affect picture quality.

Turntable speed errors result from several sources: for example, main motor load variations, manufacturing variations in the drive and the driven pulley diameters, the belt thickness variations, variations introduced by the main motor, the turntable and main motor mounting eccentricities, variations caused by the wear and tear of the parts, to name a few.

First, turntable speed errors could be reduced by employing a precision, special purpose, separate 450 rpm motor to directly drive the 450 rpm turntable. But, such a special purpose, 450 rpm motor is expensive, the cost of which may be about five times the cost of a general purpose, off-the-shelf 3,600 rpm motor including the speed change mechanism. Further, such a special purpose motor is likely to be bulkier.

Second, the main motor, besides driving the turntable to rotate, may also be used to operate various other player mechanisms: for example, a tone arm transport mechanism, a tone arm return mechanism, and a disc record change mechanism. Since the loads placed by these mechanisms on the main motor are spasmodic and not uniform, the main motor speed and the turntable speed may be affected.

Third, turntable speed errors introduced by the myriad sources could be minimized by employing precision tolerances and design. But, there are practical considerations, such as, commercial affordability and limitations placed by the technology. Moreover, although precision components and design reduce the turntable speed errors due to these sources, residual velocity errors sufficient to affect the quality of reproduction will remain. To illustrate the magnitude of residual errors the following examples will be considered. An illustrative drive pulley diameter is 1.09 ± 0.00025 inches. The driven pulley diameter is 9.00 ± 0.003 inches. The belt thickness is 0.040 ± 0.002 inches. The main motor speed is 3,600 rpm. Even assuming for the sake of argument that no speed errors are introduced by the main motor, speed errors of the order of ± 0.25 percent are introduced by the compounded tolerances alone, and actual speed errors may exceed ± 0.50 percent including the aforementioned sources of error, which is undesirable for proper operation of the playback system.

It is therefore desirable to provide a turntable speed lock system which will maintain the turntable rotation at the predetermined speed within the specified tolerance limits and still is relatively simple in design and inexpensive to manufacture.

SUMMARY OF THE INVENTION

A turntable speed lock system includes drive means for driving a turntable to rotate near a predetermined speed. A ring member is mounted concentrically on the turntable for rotation therewith. The ring member has a plurality of permanently magnetized poles of alternate polarity along the periphery thereof. A stator assembly, fixedly mounted on a turntable mounting plate, includes a core with an airgap for receiving the rotatable ring member. The stator assembly further includes a field winding for establishing an alternating magnetic field across the airgap. The magnetized poles freely travel, a seriatim, through the airgap. The reluctance of a magnetic circuit including the airgap is minimum when the turntable-mounted ring member is rotating at the predetermined speed thereby locking the turntable to rotate at the predetermined speed.

According to a further feature of the present invention, the drive means comprises a main motor and yieldable belt means which is coupled to the main motor and the turntable. The belt means is yieldable so that the turntable can be adjusted to rotate at the predetermined speed despite the speed variations in the main motor speed.

BRIEF DESCRIPTION OF THE DRAWINGS

Other objects, features and advantages of this invention will be more fully understood from the following detailed description of the preferred embodiment, the appended claims and the accompanying drawings, in which:

DETAILED DESCRIPTION OF THE PREFERRED EMBODIMENT

Figure 1:
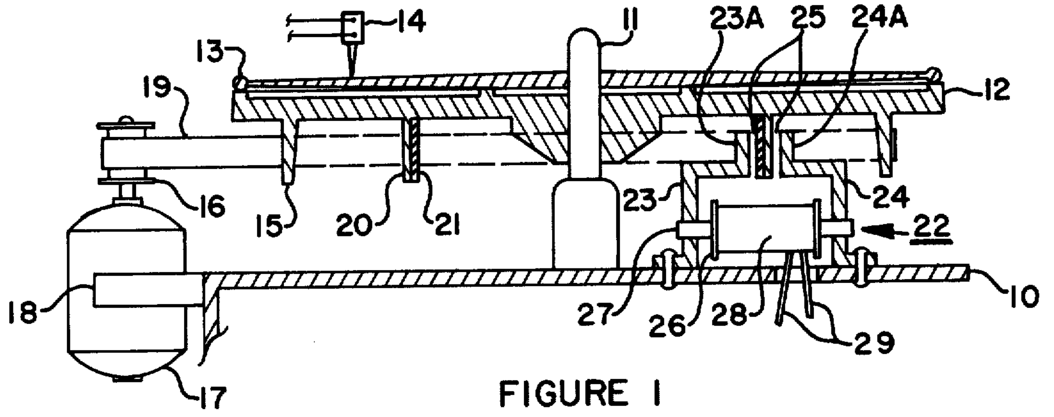
FIG. 1 is an elevation, partly in section, illustrating a preferred embodiment of a turntable speed lock system according to the present invention.
Figure 2:
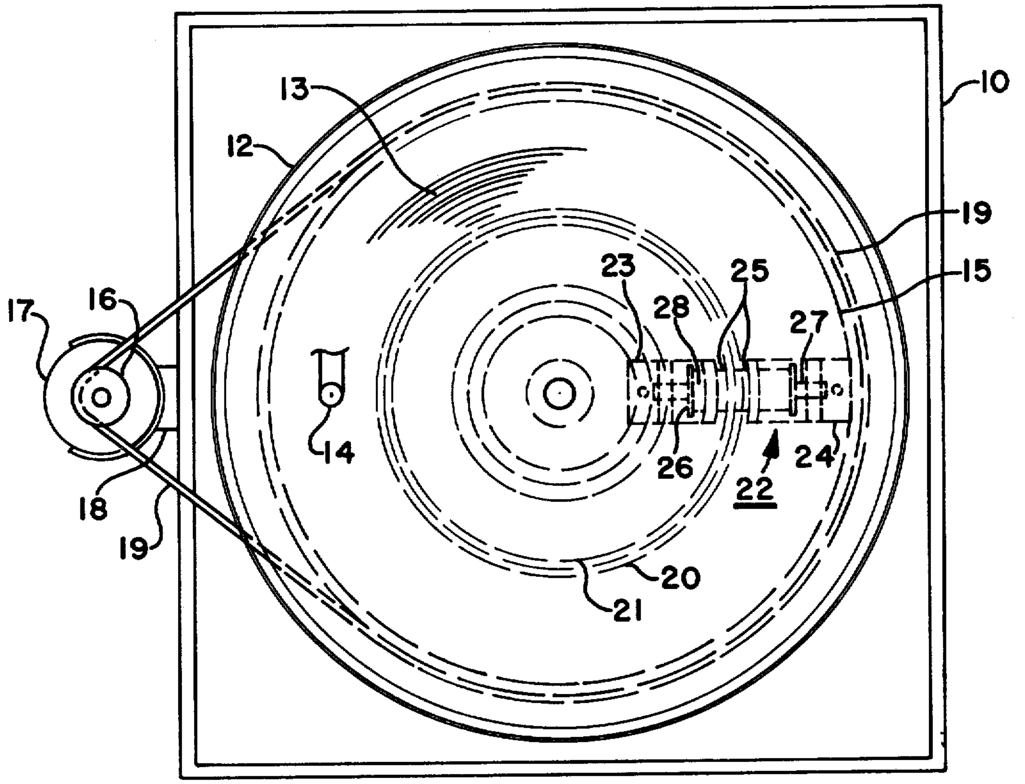
FIG. 2 is a top view of the preferred embodiment of FIG. 1.

Referring to the drawings, wherein like reference numerals designate similar elements in the various views, in FIGS. 1 and 2 a video disc playback apparatus is shown having a turntable mounting plate 10. The apparatus is suitable for use in a video disc system such as disclosed in the aforementioned copending Clemens' application (U.S. patent application, Ser. No. 126,772). A spindle 11, carrying a turntable 12, is mounted for rotation on the mounting plate 10. The upper surface of the turntable 12 is adapted to support a video disc record 13. The turntable 12 may be made from a relatively nonmagnetic material. A signal pickup 14 recovers prerecorded signal, when a relative motion is established between the disc 13 and the pickup, for playback. The turntable 12 has an outer downwardly depending flange 15 which serves as a driven pulley. A drive pulley 16 is mounted on the axle of a main motor 17. A bracket 18 attached to the mounting plate 10 firmly supports the motor 17. The main motor 17 drives the turntable 12 to rotate via a yieldable belt 19 which connects the drive pulley 16 with the driven pulley 15. Although a yieldable belt 19 is preferred to connect the main motor 17 with the turntable 12 for reasons to be given subsequently, it is noted that any other suitable drive arrangement, such as a gear drive, could be used to drive the turntable 12 by the main motor 17. The main motor 17 may be any general purpose, off-the-shelf, induction or synchronous type motor which is commercially available.

The yieldable belt 19 is mounted in a non-slip relation around the periphery of the driven pulley 15 and the drive pulley 16. The belt 19 is fabricated from an elastic, creepable material such as neoprene rubber or polyurethane. The yieldable belt 19 yields to permit the turntable 12 to rotate at the predetermined speed despite any speed variations in the main motor 17 speed. For example, when the drive pulley 16, mounted on the main motor 17 axle, is rotating at a speed higher than that required to maintain the turntable 12 at the predetermined speed, the portion of the belt 19 coming onto the drive pulley is stretched and the portion of the belt coming off the drive pulley is relieved or compressed without causing slippage between the belt and the drive and driven pulleys, and vice versa.

Figure 3:
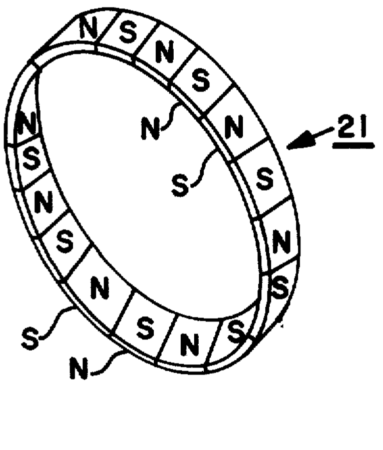
FIG. 3 illustrates a ring member having permanently magnetized poles of alternate polarity along its periphery suitable for use with the preferred embodiment of FIGS. 1 and 2.

As illustrated in FIGS. 1 and 2, the turntable 12 has an inner downwardly depending concentric flange 20. A rotor ring member 21, having a plurality of permanently magnetized poles of alternate polarity along its periphery, is fitted on the flange 20. Any suitable method could be used for fitting the ring member to the flange 20. For example: press fitting or gluing. As illustrated in FIG. 3, there are a total of 16 permanently magnetized poles in the preferred embodiment of the present invention. The ring member 21 is made from "Plastiform Brand Permanent Magnet" material, BX-1013, type 1.4 H, manufactured by Industrial Electrical Products Division of 3M Company, Saint Paul, Minn., 55101, in the preferred embodiment of the present invention. Referring now to FIGS. 1 and 2, a stator assembly 22 includes a core formed by two plates 23 and 24 fixedly mounted on the mounting plate 10. The core is made of a magnetic flux-carrying material, such as cold rolled steel. The core plates 23 and 24 may be fabricated from a solid stock of material or assembled from thin laminations. A pair of pole faces 23a and 24a of core plates 23 and 24 define an airgap 25 therebetween for receiving the rotatable ring member 21 mounted on the inner downwardly depending flange 20. The length of the airgap 25 preferably is the same as the circumferential length of each of the permanently magnetized poles of the ring member 21 for a greater efficiency of magnetic coupling. The airgap 25 is in the shape of an arc concentric with the turntable 12 in order to obtain a uniform gap width. The width of the airgap 25 depends here on the combined thickness of the ring member 21 and the flange 20 and the strength of the magnetic coupling desired across the airgap. Thus, ordinarily it is desirable to make the airgap large so that the magnetized poles pass freely, a seriatim, through the airgap. But, the strength of the magnetic coupling should not be too low so as to prevent effective operation of the turntable speed lock system.

The stator assembly 22 further includes a bobbin 26 made of any suitable material, such as plastic, supported on a support leg 27 which is held between the core plates 23 and 24. The support leg 27 is also made of a magnetic flux-carrying material. A field winding 28 is wound on the bobbin 26 for establishing an alternating magnetic flux field in the core plates 23 and 24 and across the airgap 25 when suitably energized by an alternating current source. The source (e.g., 110*v*, 60 cps), not shown, is coupled to the field winding 28 by a pair of leads 29.

The magnetic circuit includes the support leg 27, the core plates 23 and 24, the airgap 25, the rotatable ring member 21 and the flange 20.

The principle of operation of the turntable speed lock system is analogous to the operation of a synchronous motor and is as follows. In any magnetic circuit including a fixed and movable magnetic flux-carrying element, the movable element will tend to assume a position such that the reluctance of the magnetic circuit is minimum, and a synchronizing force is exerted on the movable element to try to make it assume the position of minimum reluctance. In the preferred embodiment of the present invention the variable reluctance across the airgap 25 is minimum when the turntable mounted ring member 21 is rotating at the predetermined speed. In the preferred embodiment the predetermined speed is arrived at as follows. The predetermined speed (e.g., 7.5 rps) is equal to the frequency of the power supply (e.g., 60 cps) divided by the number of pole pairs (e.g., 8). It will be noted that the reluctance of the magnetic circuit, including the airgap 25, is minimum when the variable portion of the reluctance (i.e., the reluctance across the airgap) is minimum. If the turntable 12 rotates at a higher speed than the predetermined speed, the synchronizing force will tend to decelerate the turntable and vice versa. Thus, the turntable is locked to rotate at the predetermined speed. Experience indicates that speed accuracy better than ±0.01 percent can be obtained by the turntable speed lock system of the present invention.

The turntable speed lock system of the present invention is inexpensive, simple and rugged in construction, amenable to mass production techniques, and yet it is highly accurate (e.g., speed errors less than ±0.01 percent). Thus, the turntable speed lock system of the present invention obtains results long sought by the information recording and playback industry but which were unobtainable until the present invention.

Figure 4:
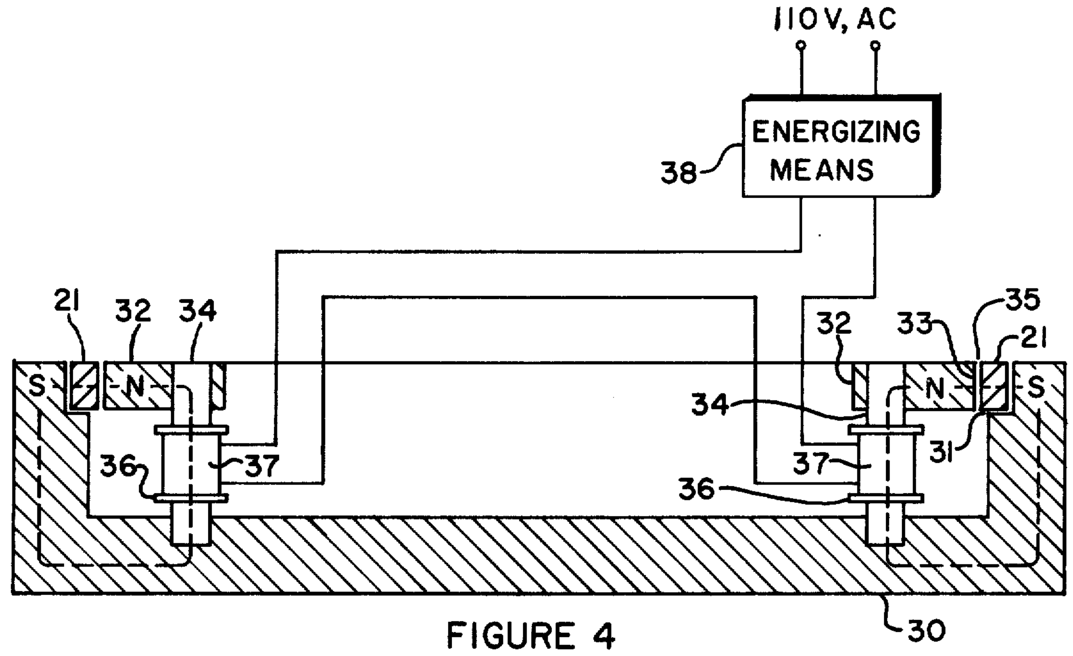
FIG. 4 is an elevation, partly in section, illustrating an apparatus for permanently magnetizing the ring member of FIG. 3.
Figure 5:
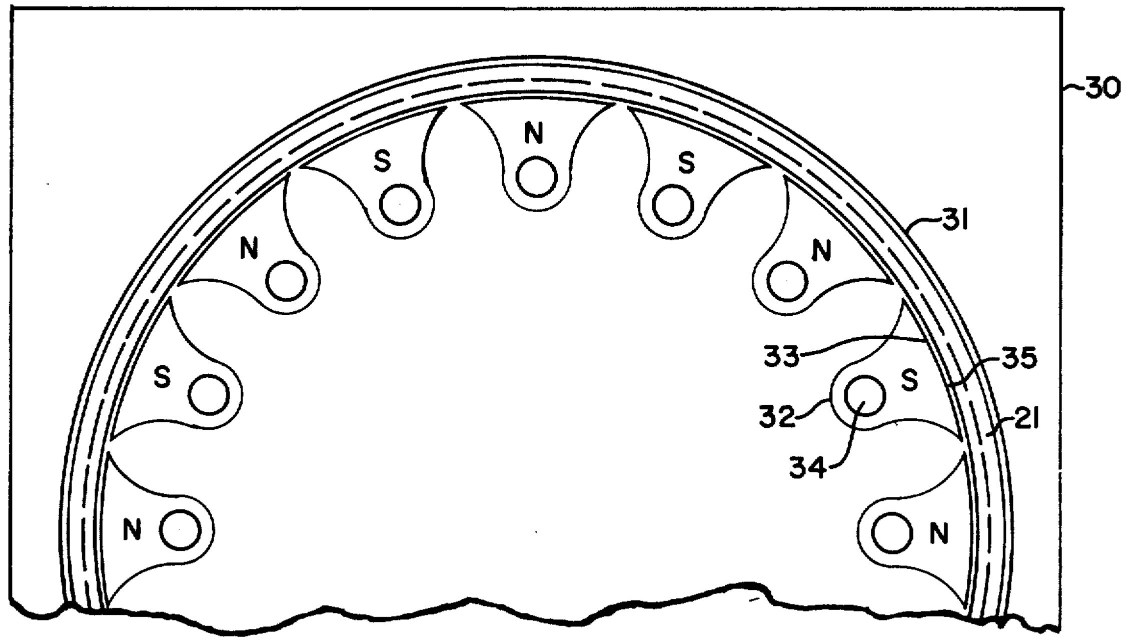
FIG. 5 is a top view of the apparatus of FIG. 4.

Reference is now made to FIGS. 4 and 5 illustrating, respectively, an elevation and a top view, of an apparatus for permanently magnetizing the ring member 21 of FIG. 3. A housing 30, formed from a magnetic flux-carrying material, has a circular recess 31 for operatively receiving the ring member 21. As indicated before, the ring member 21 may be made from "Plastiform Brand Permanent Magnet" material, BX11031, type 1.4 H, manufactured by Industrial Electrical Products Division of 3M Company, Saint Paul, Minn., 55101. A plurality of shoes (illustratively, 16 in the preferred embodiment) 32 formed from a magnetic flux-carrying material are provided with an arcuate face portion 33. A plurality of support legs 34, also made from a magnetic flux-carrying material, support the shoes 32. In the preferred embodiment the housing 30, the shoes 32, and the support legs 34 are made from silicon steel. The support legs 34, carrying the shoes 32, are mounted in the housing 30 in such a manner that the face portions 33 of the shoes define a smooth surface which is complementary to the ring member 21 periphery and juxtaposed therewith. An airgap 35 is formed between the inner periphery of the ring member 21 and the face portions 33 of the shoes 32. Bobbins 36, made from any suitable material, such as plastic, are supported on the legs 34. Field windings 37 are wound on the bobbins 36 for establishing a unidirectional magnetic flux in each of the shoes 32. An energizing means 38 is coupled to the field windings 37 for supplying a direct current pulse of a specified duration of time. The direct current direction through the field windings 37 is such that the magnetic flux direction in each of the shoes 32 is opposite of the magnetic flux direction in an adjacent shoe. The polarity of the shoes is indicated more clearly in FIG. 5.

Figure 6:
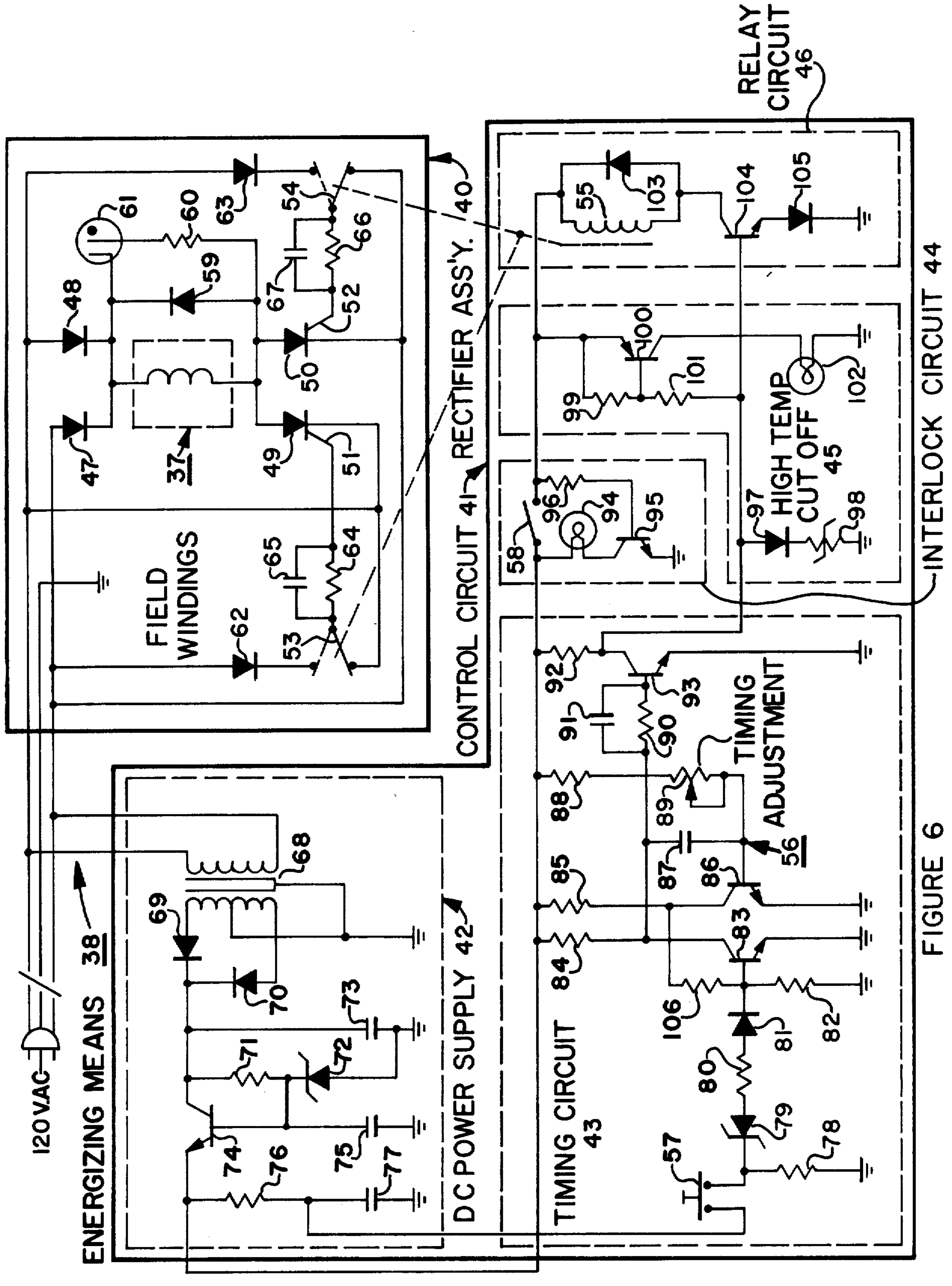
FIG. 6 is a schematic diagram, partly in block form, of an energizing means for supplying a direct current pulse of a specified duration suitable for use with the apparatus of FIGS. 4 and 5.

Reference is now made to FIG. 6. FIG. 6 is a schematic diagram, partly in block form, of the energizing means 38 for supplying a direct current pulse of a specified amplitude and duration for permanently magnetizing the ring member 21.

The energizing means 38 of the preferred embodiment includes, first, a rectifier assembly 40, for supplying a direct current pulse of a specified amplitude to the field windings 37, and second, a control circuit 41, for limiting the length of the pulse for a specified duration. For the purpose of clarity, only one field winding coil 37 is shown in FIG. 6. The control circuit 41 includes, first, a direct current power supply circuit 42, second, a timing circuit 43, third, an interlock circuit 44, fourth, a high temperature cutoff circuit 45, and fifth, a relay circuit 46. The rectifier assembly 40 is connected to a source of supply voltage (e.g., 110v, 60 cps), not shown. The rectifier assembly 40 includes diodes 47 and 48 and silicon controlled rectifiers (SCR's) 49 and 50. When the control gates 51 and 52 of the SCR's 49 and 50 are biased for operation by the control circuit 41, the direct current flows in each half of the alternating cycle in the same direction through the field windings 37. The control gates 51 and 52 of the SCR's 49 and 50 are biased for operation by switches 53 and 54 which are in turn activated by the coil 55 of the relay circuit 46. The period of operation of the relay circuit 46, which determines the duration of the direct current pulse in the field windings 37, is adjusted by setting the time constant of an RC circuit 56 included in the timing circuit 43. The timing circuit 43 is activated by a push button switch 57. The DC power supply circuit 42, coupled to a source of supply voltage (e.g., 110v, 60 cps), not shown, supplies DC voltage to the timing circuit 43, the interlock circuit 44, the high temperature cutoff circuit 45, and the relay circuit 46. The interlock circuit 44 inactivates the relay circuit 46 by opening a switch 58 when the lid (not shown) of the apparatus of FIG. 4 is raised. The field windings 37 are thermally linked to the resistor element 98 of the high temperature cutoff circuit 45. Therefore, when the temperature of the field windings 37 becomes excessive, the high temperature cutoff circuit 45 disables the relay circuit 46. The indicator lamps 61, 94, and 102 indicate, respectively, the magnetization of the ring member 21, the raising of the lid (not shown) of the apparatus of FIG. 4, and the overheating of the field windings 37.

Illustratively, the values of the circuit elements of FIG. 6 are as follows:

| | | |
|---|---|---|
| A. | Capacitors: | |
| | Capacitors 65 and 67 | 0.47 Microfarads |
| | Capacitor 73 | 1,500 Microfarads |
| | Capacitor 75 | 1,000 Microfarads |
| | Capacitors 77 and 87 | 20 Microfarads |
| | Capacitor 91 | 0.001 Microfarads |
| B. | Resistors | |
| | Resistor 60 | 22 Kilohms |
| | Resistors 64 and 66 | 1 Kilohms |
| | Resistors 71 and 78 | 0.820 Kilohms |
| | Resistor 76 | 330 Kilohms |
| | Resistor 80 | 33 Kilohms |
| | Resistor 82 | 5.6 Kilohms |
| | Resistors 84, 85 and 99 | 2.2 Kilohms |

-continued

| | | |
|---|---|---|
| | Resistor 88 | 8.2 Kilohms |
| | Resistor 89 (variable) | 100 Kilohms |
| | Resistor 90 | 82 Kilohms |
| | Resistor 92 | 6.8 Kilohms |
| | Resistor 96 | 11 Kilohms |
| | Resistor 98 | T53-65 (Multi State Ltd.) |
| | Resistors 99 and 101 | 9.1 Kilohms |
| | Resistor 106 | 27 Kilohms |
| C. | Inductors: | |
| | Coil 55 | 12 Volts, 100 Milliamperes |
| D. | Diodes | |
| | Diodes 47 and 48 | MR1213SB (Motorola) |
| | Diodes 62, 63, 69, 70, 81, 97, 103 and 105 | 1 Amp. Silicon Diode |
| | Diode (Zener) 72 | 12 Volts, 1 Watt |
| | Diode (Zener) 79 | 8.2 Volts, 1 Watt |
| E. | Silicon Controlled Rectifiers: | |
| | 49 and 50 | 2N4362 (Motorola) |
| F. | Transistors: | |
| | Transistors 74 and 104 | Type 40250 (RCA) |
| | Transistors 83, 86, 93 and 95 | 2N3860 (Motorola) |
| | Transistor 100 | MPSU55 (Motorola) |
| G. | Indicators: | |
| | Lamp 61 | Neon Indicator |
| | Lamps 94 and 102 | 12 Volts, 50 Milliamperes |
| H. | Transformer (Stepdown): | |
| | 68 | 25 Volts, 1 Ampere |

What is claimed is:

1. A turntable speed lock system comprising:

1. a mounting plate;

2. a turntable mounted for rotation on said mounting plate, said turntable including a concentric ring member wherein said ring member has a plurality of permanently magnetized poles of alternate polarity along the periphery thereof;

3. means for driving said turntable to rotate at an average predetermined speed comprising:

A. a main motor, and

B. variable coupling means for transferring motion of said main motor to said turntable; and

4. a stator assembly fixedly mounted on said mounting plate, said stator assembly including:

A. a core having an airgap for receiving said rotatable turntable ring member, and B. a field winding for establishing an alternating magnetic field across said airgap when energized, wherein said permanently magnetized poles travel in a circular path, a seriatim, through said airgap, wherein the reluctance across said airgap is minimum when said turntable is rotating at the predetermined speed, and wherein the coupling provided by said variable coupling means varies in a manner that enables said ring member/stator assembly to maintain said turntable rotation at the predetermined speed when the speed of the main motor is asynchronous with the predetermined speed.

2. A turntable speed lock system as defined in claim 1 wherein said variable coupling means comprises: yieldable belt mechanically coupled in a non-slip relation to said turntable and said main motor for driving said turntable to rotate near the predetermined speed, and wherein said belt yields so that said turntable can be adjusted to rotate at the predetermined speed despite any speed variations in the main motor speed.

3. A turntable speed lock system as defined in claim 2 wherein said main motor is a synchronous type motor.

4. A turntable speed lock system as defined in claim 2 wherein said main motor is an induction type motor.

5. A turntable speed lock system as defined in claim 2 wherein said belt means is fabricated from neoprene rubber.

6. A turntable speed lock system as defined in claim 2 wherein said belt means is fabricated from polyurethane.

7. A turntable speed lock system as defined in claim 1 wherein said airgap is in the shape of an arc which is concentric with said turntable.

8. A turntable speed lock system as defined in claim 1 wherein said turntable is made of relatively nonmagnetic material.

9. A turntable speed lock system comprising:

1. a mounting plate;

2. a turntable mounted for rotation on said mounting plate;

3. means for driving said turntable to rotate at an average predetermined speed comprising:

A. a main motor, and

B. yieldable belt coupled in a non-slip relation to said turntable and said main motor for driving said turntable;

4. a rotor coupled to said turntable for rotation therewith, said rotor including a ring member having a plurality of permanently magnetized poles of alternate polarity along the periphery thereof; and

5. a stator assembly fixedly mounted on said mounting plate, said stator assembly including:

A. a core having an airgap for receiving said rotor ring member, and

B. a field winding for establishing an alternating magnetic field across said airgap when energized, wherein said permanently magnetized poles travel in a circular path and pass freely, a seriatim, through said airgap, wherein the reluctance across said airgap is minimum when said turntable mounted rotor is rotating at the predetermined speed, and wherein the yieldable belt yields in a manner that enables said ring member/stator assembly to maintain said turntable rotation at the predetermined speed when the speed of the main motor is asynchronous with the predetermined speed.

10. A turntable speed lock system as defined in claim 9 wherein said turntable has a downwardly depending flange which is concentric with said turntable and wherein said rotor ring member is secured to said flange for rotation therewith.

* * * * *